United States Patent
Lim et al.

(10) Patent No.: US 12,500,308 B2
(45) Date of Patent: Dec. 16, 2025

(54) BATTERY VALVE AND BATTERY INCLUDING THE SAME

(71) Applicant: LG ENERGY SOLUTION, LTD., Seoul (KR)

(72) Inventors: Hun Hee Lim, Daejeon (KR); Hyung Kyun Yu, Daejeon (KR); Sang Hun Kim, Daejeon (KR); Min Hyeong Kang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 626 days.

(21) Appl. No.: 17/911,530

(22) PCT Filed: Jul. 13, 2021

(86) PCT No.: PCT/KR2021/008984
§ 371 (c)(1),
(2) Date: Sep. 14, 2022

(87) PCT Pub. No.: WO2022/015025
PCT Pub. Date: Jan. 20, 2022

(65) Prior Publication Data
US 2023/0138465 A1  May 4, 2023

(30) Foreign Application Priority Data
Jul. 13, 2020  (KR) .................. 10-2020-0086276

(51) Int. Cl.
*H01M 50/317* (2021.01)
*G01R 31/36* (2020.01)
(Continued)

(52) U.S. Cl.
CPC ...... *H01M 50/317* (2021.01); *G01R 31/3646* (2019.01); *H01M 10/425* (2013.01);
(Continued)

(58) Field of Classification Search
CPC .. H01M 50/317; H01M 10/425; H01M 10/48; G01R 31/3646
See application file for complete search history.

(56) References Cited

U.S. PATENT DOCUMENTS

| 5,736,836 A | 4/1998 | Hasegawa et al. |
| 2008/0166625 A1 | 7/2008 | Schembri et al. |

(Continued)

FOREIGN PATENT DOCUMENTS

| CN | 101138110 A | 3/2008 |
| CN | 101335338 A | 12/2008 |
| CN | 107134554 A | 9/2017 |
| CN | 107768777 A | 3/2018 |

(Continued)

OTHER PUBLICATIONS

International Search Report (PCT/ISA/210) issued in PCT/KR2021/008984 mailed on Oct. 26, 2021.

*Primary Examiner* — Sarah A. Slifka
(74) *Attorney, Agent, or Firm* — Birch, Stewart, Kolasch & Birch, LLP

(57) ABSTRACT

Discussed is a battery valve configured to discharge a gas inside a battery to the outside, the battery valve including a communicator configured to receive a battery valve opening/closing command from an external device; and an opening/closing controller configured to open or close a passage through which the inside of the battery and the outside of the battery communicate with each other according to the battery valve opening/closing command.

18 Claims, 10 Drawing Sheets

(51) Int. Cl.
  *H01M 10/42* (2006.01)
  *H01M 10/48* (2006.01)

(52) U.S. Cl.
  CPC .... *H01M 10/48* (2013.01); *H01M 2010/4271* (2013.01); *H01M 2010/4278* (2013.01); *H01M 2200/20* (2013.01)

(56) References Cited

U.S. PATENT DOCUMENTS

| | | |
|---|---|---|
| 2009/0004553 A1 | 1/2009 | Nakamura |
| 2015/0064512 A1 | 3/2015 | Turney et al. |
| 2016/0291606 A1 | 10/2016 | Someya et al. |
| 2017/0222274 A1 | 8/2017 | Sohn et al. |
| 2018/0047972 A1 | 2/2018 | Chung et al. |
| 2018/0212284 A1 | 7/2018 | Honda |
| 2020/0078623 A1 | 3/2020 | Ling et al. |
| 2020/0194848 A1 | 6/2020 | Honda |
| 2020/0212399 A1 | 7/2020 | Choi et al. |
| 2020/0386326 A1 | 12/2020 | Love |
| 2022/0181741 A1 | 6/2022 | Honda |
| 2022/0263187 A1 | 8/2022 | Choi et al. |

FOREIGN PATENT DOCUMENTS

| | | |
|---|---|---|
| CN | 109671993 A | 4/2019 |
| CN | 110893266 A | 3/2020 |
| CN | 111052444 A | 4/2020 |
| CN | 111108316 A | 5/2020 |
| JP | 59-195669 U | 12/1984 |
| JP | 9-283106 A | 10/1997 |
| JP | 2002-289262 A | 10/2002 |
| JP | 2004-39337 A | 2/2004 |
| JP | 2004-108394 A | 4/2004 |
| JP | 2006-100152 A | 4/2006 |
| JP | 4095870 B2 | 6/2008 |
| JP | 2008-533658 A | 8/2008 |
| JP | 2008-204991 A | 9/2008 |
| JP | 2014-72084 A | 4/2014 |
| JP | 2018-120852 A | 8/2018 |
| KR | 10-1999-0085939 A | 12/1999 |
| KR | 10-2007-0121732 A | 12/2007 |
| KR | 10-2008-0008922 A | 1/2008 |
| KR | 10-2009-0120268 A | 11/2009 |
| KR | 10-2015-0042144 A | 4/2015 |
| KR | 10-2017-0040919 A | 4/2017 |
| KR | 10-2017-0082811 A | 7/2017 |
| KR | 10-2017-0092344 A | 8/2017 |
| KR | 10-1814274 B1 | 1/2018 |
| KR | 10-2019-0012325 A | 2/2019 |
| KR | 10-2039205 B1 | 10/2019 |

BATTERY VALVE AND BATTERY INCLUDING THE SAME

CROSS-REFERENCE TO RELATED APPLICATION

This application claims the priority of Korean Patent Application No. 10-2020-0086276, filed on Jul. 13, 2020, in the Korean Intellectual Property Office, the disclosure of which is incorporated herein by reference.

TECHNICAL FIELD

The present invention relates to a battery valve for discharging a gas inside a battery to the outside and a battery including the same.

BACKGROUND ART

Recently, research and development on secondary batteries have been actively carried out. Here, the secondary battery is a chargeable and dischargeable battery and includes all of the conventional Ni/Cd and Ni/MH batteries and the latest lithium ion batteries. Among secondary batteries, lithium ion batteries have an advantage in that their energy density is much higher than that of each of the conventional Ni/Cd and Ni/MH batteries. In addition, the lithium ion batteries may be manufactured in a small size and light weight and thus be used as power sources for mobile devices. In addition, the lithium ion batteries have been attracting attention as next-generation energy storage media due to their extended use range as power sources for electric vehicles.

In addition, such a secondary battery is generally used as a battery pack including a battery module in which a plurality of battery cells are connected in series and/or in parallel. In addition, a state and operation of the battery pack are managed and controlled by a battery management system.

In such a secondary battery, as the energy density increases, an amount of electrolyte increases, and thus, an amount of gas generated inside the secondary battery also increases. If the gas generated inside the secondary battery is discharged to the outside, external moisture may be penetrated into the secondary battery. As described above, when moisture is penetrated into the battery, a side reaction may occur, resulting in deterioration of the performance of the secondary battery and generation of an additional gas.

Thus, there is a need for a solution for discharging a gas generated from the inside of the battery to the outside while minimizing the amount of moisture penetrated into the battery from the outside.

DISCLOSURE OF THE INVENTION

Technical Problem

Embodiments of the present invention are directed to solve the above problems, and an object of the present invention is to provide a battery valve that is opened or closed in time by diagnosing a state of a battery from the outside to discharge a gas inside the battery while minimizing penetration of moisture from the outside, thereby preventing the battery from being deteriorated in performance and allowing a user to easily operate the battery valve, and a battery including the same.

Technical Solution

A battery valve configured to discharge a gas inside a battery to the outside according to an embodiment of the present invention includes a communication unit configured to receive a battery valve opening/closing command from an external device and an opening/closing control unit configured to open or close a passage through which the inside of the battery and the outside of the battery communicate with each other according to the battery valve opening/closing command.

A battery according to an embodiment of the present invention includes a battery electrode, a battery case configured to accommodate the battery electrode, and a battery valve configured to open or close a passage through which the inside of the battery case and the outside of the battery case communicate with each other according to a battery valve opening/closing command received from an external device.

A battery valve configured to discharge a gas inside a battery to the outside according to an embodiment of the present invention includes a sensor unit configured to measure a pressure inside the battery and an opening/closing control unit configured to open or close a passage through which the inside of the battery and the outside of the battery communicate with each other by comparing the pressure inside the battery to a reference value.

Advantageous Effects

According to the battery valve according to the embodiment of the present invention, the state of the battery may be diagnosed from the outside to open or close the valve in time, thereby preventing the battery from being deteriorated in performance while minimizing the penetration of the moisture from the outside and allowing the user to easily operate the battery valve.

MODE FOR CARRYING OUT THE INVENTION

Figure 1:
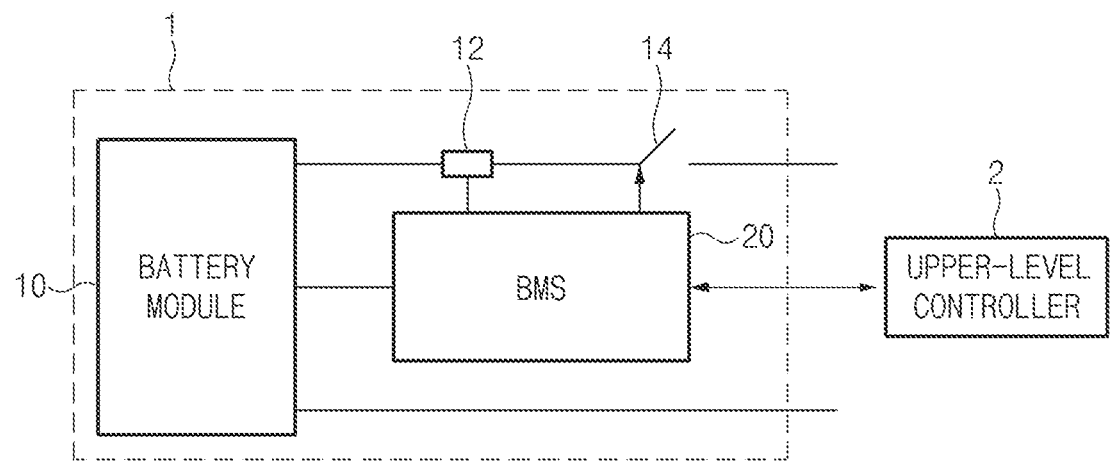
FIG. 1 is a block diagram illustrating a configuration of a battery control system.

Hereinafter, various embodiments will be described in detail with reference to the accompanying drawings. In this document, the same reference numerals are used for the same components in the drawings, and duplicated descriptions of the same components will be omitted.

For the various embodiments of the present invention disclosed in this document, specific structural or functional descriptions have been exemplified for the purpose of describing the embodiments of the present invention only, and various embodiments of the present invention may be implemented in various forms and should not be construed as being limited to the embodiments described in this document.

Expressions such as "first", "second", "firstly", or "secondly" used in various embodiments may modify various elements regardless of their order and/or importance and may not limit the corresponding elements. For example, the first component may be referred to as the second element, and similarly, the second component may be referred to as the first component without departing from the scope of the present invention.

Terms used in this document are only used to describe a specific embodiment and may not be intended to limit the scope of other embodiments. The terms of a singular form may include plural forms unless referred to the contrary.

All terms used herein, which include technical or scientific terms, may have the same meaning as commonly understood by one of ordinary skill in the art of the present invention. Terms defined in general used in the dictionary may be interpreted as having the same or similar meaning as the meaning in the context of the related art, and unless explicitly defined in this document, it is not interpreted in an ideal or excessively formal meaning. In some cases, even terms defined in this document may not be construed to exclude embodiments of the present invention.

FIG. 1 is a block diagram illustrating a configuration of a battery control system.

Referring to FIG. 1, a battery control system including a battery pack 1 and an upper-level controller included in a host system according to an embodiment of the present invention is schematically illustrated.

As illustrated in FIG. 1, the battery pack 1 is constituted by one or more battery cells and includes a chargeable/dischargeable battery module 10, a switching part connected in series to a positive (+) terminal-side or a negative (−) terminal-side of the battery module 10 to control a flow of charge/discharge current of the battery module 10, and a battery management system 20 monitoring a voltage, current, a temperature, and the like of the battery pack 1 to prevent overcharging and overdischarging from occurring.

Here, the switching part 14 may be a semiconductor switching element for controlling the flow of the charge/discharge current of the battery module 10. For example, at least one MOSFET, relay, or magnetic contactor may be used as the switching part 14 according to a specification of the battery pack 1.

In addition, the BMS 20 may measure or calculate a voltage and current of each of a gate, a source, and a drain of the semiconductor switching element in order to monitor the voltage, the current, the temperature, and the like of the battery pack 1. In addition, the BMS 20 may measure the current, the voltage, the temperature, and the like of the battery pack by using a sensor 12 provided to be adjacent to the semiconductor switching element. The BMS 20 may be an interface for receiving the measured values of the above-described various parameters and may include a plurality of terminals and a circuit connected to the terminals to process the received values.

In addition, the BMS 20 may control ON/OFF of the switching part 14, for example, the MOSFET and may be connected to the battery module 10 to monitor a state of the battery module 10.

The upper-level controller 2 may transmit a control signal for the battery module to the BMS 20. Thus, an operation of the BMS 20 may be controlled based on a signal applied from the upper-level controller. The battery cell according to the present invention may be a configuration included in the battery pack used for an energy storage system (ESS) or a vehicle. In this case, the upper-level controller 2 may be an ESS controller or a vehicle controller. However, the battery pack 1 is not limited to the above-described purpose.

Since the configuration of the battery pack 1 and the configuration of the BMS 20 are known configurations, a more detailed description thereof will be omitted.

Figure 2:
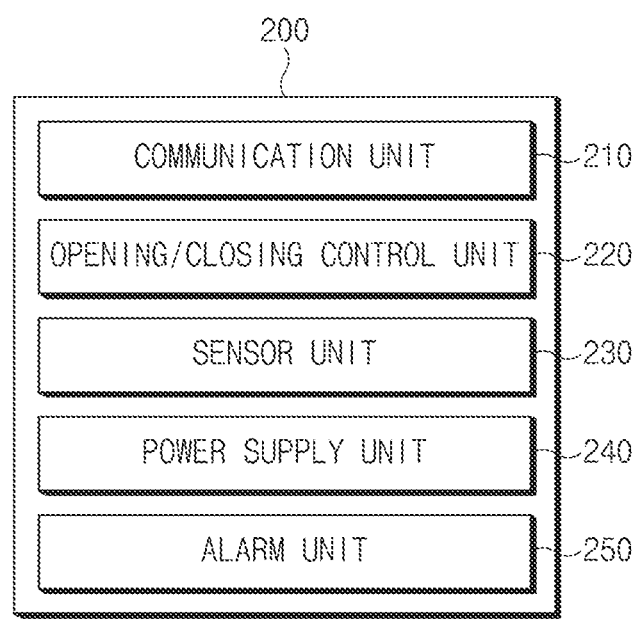
FIG. 2 is a block diagram illustrating a configuration of a battery valve according to an embodiment of the present invention.

FIG. 2 is a block diagram illustrating a configuration of a battery valve according to an embodiment of the present invention.

Referring to FIG. 2, a battery valve 200 according to an embodiment of the present invention includes a communication unit 210, an opening/closing control unit 220, a sensor unit 230, a power supply unit 240, and an alarm unit 250.

The communication unit 210 may receive a valve opening/closing command from an external device. That is, when a user inputs a command to open or close the battery valve 200 using the external device, the communication unit 210 may receive the corresponding valve opening/closing command from the external device. Here, the external device refers to various devices that allow the user to control the opening or closing of the battery valve 200 from the outside and may include a battery management system (BMS), a user terminal (e.g., a mobile phone, a tablet PC, desktop, etc.). Here, the communication unit 210 may communicate with the external device in a wired (cable) or wireless (e.g., Wi-Fi, Bluetooth, NFC, etc.) manner.

The communication unit 210 may transmit battery state information to the external device. Here, the battery state information may be received from the battery management system or a separate measurement circuit and may include a voltage, current, a temperature, and the like of the battery. Also, the communication unit 210 may transmit the battery state information detected by the sensor unit 230 to the external device as described below. Thus, the user may check the current state of the battery through the external device and transmit a command to open the valve when it is determined that an abnormality occurs in the battery, such as a case in which an amount of gas generated inside the battery is equal to or greater than a reference value.

Also, the communication unit 210 may communicate with an external server. In this case, the communication unit 210 may transmit various information such as the battery state information detected by the sensor unit 230, whether the battery valve 200 is opened or closed, and a history of receiving the valve opening/closing command to the server.

The opening/closing control unit 220 may open or close a passage through the inside and the outside of the battery communicate with each other according to the valve opening/closing command received through the communication unit 210. As described above, the opening/closing control unit 220 may open or close the passage of the battery valve 200 according to the valve opening/closing command input by the user to discharge the gas generated inside the battery to the outside in time and minimize moisture to be diffused from the outside. For example, the opening/closing control unit 220 may be a regulator.

In addition, the opening/closing control unit 220 may automatically open or close the passage by comparing an internal pressure of the battery to a preset reference value. For example, the opening/closing control unit 220 may automatically open the valve when the pressure detected by the sensor unit 230 or the pressure received from the battery management system or the separate measurement circuit is equal to or greater than a set reference value. Thus, when the gas generated inside the battery increases by more than a predetermined value, the internal gas may be discharged to the outside by itself even if the user does not input the valve opening/closing command.

In addition, the opening/closing control unit 220 may open or close the passage through a preset cycle to periodically discharge the gas inside the battery to the outside. In this case, the battery valve 200 may include a timer to control the valve to be opened at intervals set by the user.

As described above, in the battery valve 200 according to an embodiment of the present invention, the opening/closing control unit 220 may open or close the valve according to the valve opening/closing command by the user or may allow the valve to be opened and closed by itself. Thus, even if the user does not directly manipulate the valve, the gas inside the battery may be easily discharged to the outside.

The sensor unit 230 may measure the pressure inside the battery. Thus, it is possible to detect that a gas is generated inside the battery to increase in pressure. However, the battery valve 200 according to an embodiment of the present invention does not necessarily include the sensor unit 230, and the sensor for detecting the pressure inside the battery may be provided outside the battery valve 200. In addition, the sensor unit 230 of the battery valve 200 may include various sensors for detecting the state of the battery, such as the voltage, the current, and the temperature in addition to the pressure inside the battery.

The power supply unit 240 may supply power to the battery valve 200. For example, the power supply unit 240 may be a battery and may supply power to each of the components such as the communication unit 210, the opening/closing control unit 220, the sensor unit 230, and the alarm unit 250 of the battery valve 200. However, the battery valve 300 according to the present invention does not necessarily include the power supply unit 340 and may be configured to receive the power in a wired or wireless manner through an external power device.

The alarm unit 250 may generate a warning alarm when the pressure inside the battery is equal to or greater than the preset reference value. For example, the alarm unit 250 may transmit a notification message to the external device when the pressure inside the battery increases above the reference value. In addition, the alarm unit 250 may allow the user to recognize that the amount of gas generated inside the battery is increasing through light or a voice signal including a lamp or a speaker.

The battery valve 200 according to an embodiment of the present invention may be configured to be inserted into a sealing part of the battery. In addition, the battery may have various shapes such as a cylindrical shape, a polygonal shape, and a pouch shape.

In addition, in FIG. 2, the battery valve 200 according to an embodiment of the present invention may include a display part. In this case, the display part may visually display the pressure state inside the battery or whether the valve is currently opened or closed.

As described above, according to the battery valve 200 according to an embodiment of the present invention, the state of the battery may be diagnosed from the outside to open or close the valve in time, thereby preventing the battery from being deteriorated in performance while minimizing the penetration of the moisture from the outside and allowing the user to easily operate the battery valve.

Figure 3A:
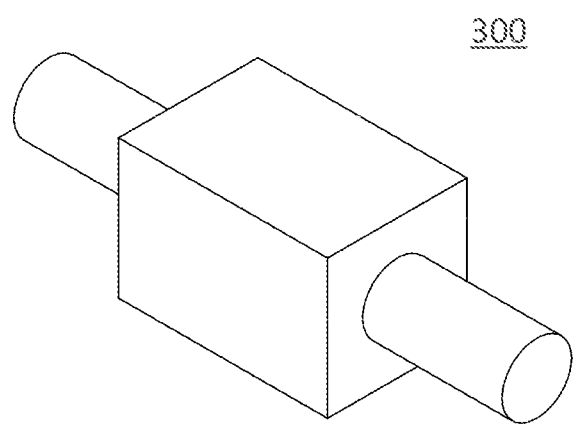
FIG. 3A is a schematic view illustrating a shape of the battery valve according to an embodiment of the present invention.
Figure 3B:
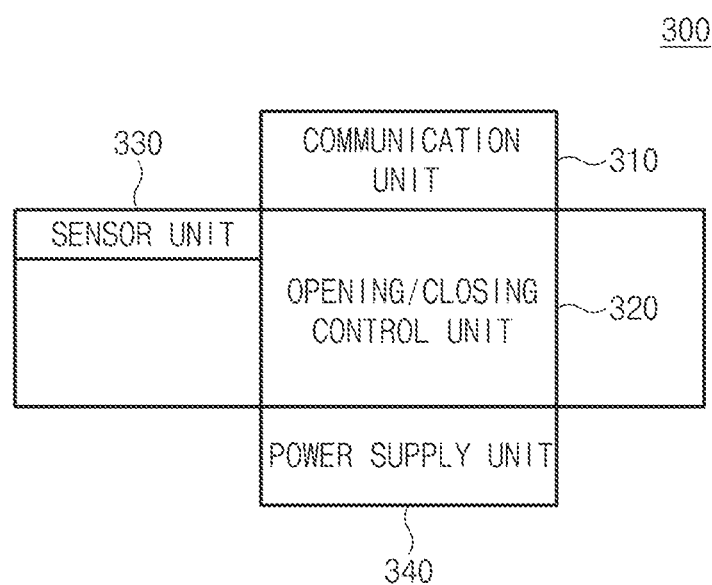
FIG. 3B is a schematic view illustrating the configurations of FIG. 2, which are included in the battery valve of FIG. 3A.

FIG. 3A is a schematic view illustrating a shape of the battery valve according to an embodiment of the present invention, and FIG. 3B is a schematic view illustrating the configurations of FIG. 2, which are included in the battery valve of FIG. 3A.

As illustrated in FIG. 3A, the battery valve 300 according to an embodiment of the present invention may have a shape of which both sides protrude to be inserted into the sealing part of the battery. In addition, the battery valve 300 may have a structure through which the gas inside the battery is discharged to the outside. In addition, a center of the battery valve may have an openable structure.

In addition, referring to FIG. 3B, a battery valve 300 according to an embodiment of the present invention has a communication unit 310, an opening/closing control unit 320, a sensor unit 330 and a power supply unit 340 in the structure illustrated in FIG. 3A. Here, since the communication unit 310, the opening/closing control unit 320, the sensor unit 330, and the power supply unit 340 have the same function as those described in FIG. 2, a detailed description thereof will be omitted. Also, in FIG. 3B, the alarm unit 250 of FIG. 2 may be provided at any position in the battery vale 300 in FIG. 3B.

For example, a left portion of the battery valve 300 of FIG. 3B may be inserted into a sealing part of the battery. Therefore, when a pressure inside the battery is measured through the sensor unit 330 disposed at the inserted portion, and the pressure increases to more than a reference value, a passage is opened through the opening/closing control unit 320 to discharge an internal gas to the outside.

Also, when receiving a valve opening/closing command from an external device, the communication unit 310 may transmit the corresponding command to the opening/closing control unit. Thus, the opening/closing control unit 320 may open or close a valve according to the command received from the outside.

In FIG. 3B, the power supply unit 340 of the battery valve 300 may be a battery and may supply power to each of the communication unit 310, the opening/closing control unit 320, and the sensor unit 330 of the battery valve 300. However, the battery valve 300 according to the present invention does not necessarily include the power supply unit 340 and may be configured to receive the power in a wired or wireless manner through an external power device.

The battery valve 300 according to the present invention is not limited to the shape illustrated in FIGS. 3A and 3B and may be manufactured in various shapes. In addition, each configuration of the battery valve 300 is not limited to the position illustrated in FIG. 3B and may be arranged at any position according to the user's needs.

Figure 4:
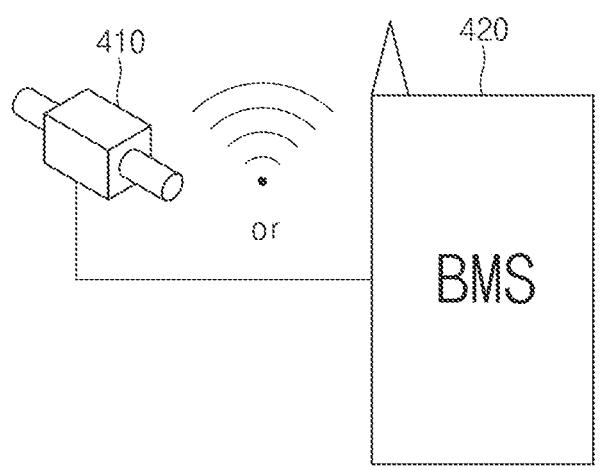
FIG. 4 is a view illustrating a state in which the battery valve and a battery management system (BMS) communicate with each other according to an embodiment of the present invention.

FIG. 4 is a view illustrating a state in which the battery valve and a battery management system (BMS) communicate with each other according to an embodiment of the present invention.

As illustrated in FIG. 4, a battery valve 410 according to an embodiment of the present invention may communicate with an external device (e.g., BMS) 420. In this case, the battery valve 410 may connect a separate cable to the external device 420 to communicate with each other in a wired manner or communicate with each other in a wireless manner through Wi-Fi, Bluetooth, or the like.

For example, the battery valve 410 may transmit a pressure value detected through the sensor unit or battery state information received from a battery measurement circuit to the external device 420. Also, the external device 420 may transmit a valve opening/closing command generated according to a user input to the battery valve 410.

In FIG. 4, the battery valve 410 and the external device 420 are shown to communicate directly with each other, but may be configured to transmit/receive various types of information through a separate server. In this case, the server may store various data such as state information such as a pressure, a voltage, and a temperature of the battery received from the battery valve 410 through a database, or a transmission/reception history of the battery valve opening/closing command.

Therefore, the battery valve 410 according to an embodiment of the present invention may perform the opening and closing operation of the valve from the outside through a device such as a BMS or a user terminal even if the user does not directly open or close the valve, thereby more easily discharging a gas inside the battery to the outside.

Figure 5A:
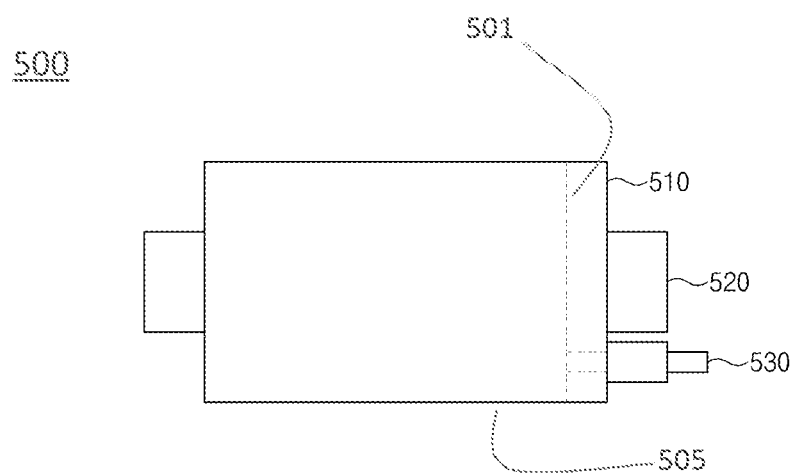
FIGS. 5A and 5B are plan and side views of a battery into which the battery valve is inserted according to an embodiment of the present invention, respectively.
Figure 5B:
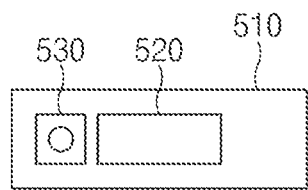

FIGS. 5A and 5B are plan and side views of a battery into which the battery valve is inserted according to an embodiment of the present invention, respectively.

Referring to FIGS. 5A and 5B, a battery 500 according to an embodiment of the present invention may include a battery case 505, a sealing part 510, an electrode lead 520, and a battery valve 530.

The sealing part 510 may seal a battery case that accommodates battery cells. For example, in the case of a pouch-type battery, when an upper pouch and a lower pouch are coupled to each other, the sealing part 510 may be formed on an edge to seal the battery. In this case, as illustrated in FIGS. 5A and 5B, the sealing part 510 may expose a portion of the electrode lead 520.

The electrode lead 520 is connected to an electrode tab of a battery electrode 501 so that electricity generated from the battery electrode flows. Particularly, the electrode lead 520 may include a positive electrode lead and a negative electrode lead. Here, a portion of the electrode lead 520 protruding to the outside of the battery case may become a terminal part and may be electrically connected to an external terminal.

As described above, the battery valve 530 may open and close a passage through which the inside and the outside of the battery case communicate with each other according to a valve opening/closing command received from an external device. In addition, even if the valve opening/closing command is not received from the external device, the battery valve 530 may automatically open or close the valve when a pressure measured by a sensor unit is equal to or greater than a reference value or may open and close the valve according to a preset cycle.

Also, the battery valve 530 may be inserted into the sealing part 510 of the battery as illustrated in FIGS. 5A and 5B. Thus, when the pressure increases due to the generation of gas inside the battery case, the internal gas may be discharged to the outside through the battery valve 530.

Although one battery valve 530 is shown to be inserted into the battery case in FIGS. 5A and 5B, a plurality of battery valves 530 may be inserted into the battery case. In addition, the position at which the battery valve 530 is inserted may be freely defined.

Figure 6:
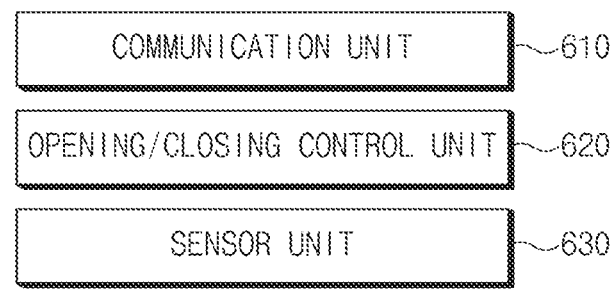
FIG. 6 is a block diagram illustrating a configuration of a battery valve according to another embodiment of the present invention.
Figure 7:
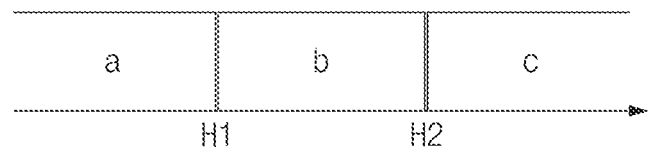
FIG. 7 is a view for explaining an operation of the battery valve according to another embodiment of the present invention.

FIG. 6 is a block diagram illustrating a configuration of a battery valve according to another embodiment of the present invention. FIG. 7 is a view for explaining an operation of the battery valve according to another embodiment of the present invention.

First, referring to FIG. 6, a battery valve 600 according to another embodiment of the present invention may include a communication unit 610, an opening/closing control unit 620, and a sensor unit 630. In addition, the battery valve 600 may further include a power supply unit and an alarm unit described with reference to FIG. 2.

The communication unit 610 may receive humidity information from an external device. For example, the humidity information may mean an absolute humidity or a concentration of vapor in the air. According to another embodiment, the absolute humidity or the concentration of vapor in the air may mean the absolute humidity outside the battery or the concentration of vapor in the air. The communication unit 610 may communicate with the external device in a wired (cable) or wireless (e.g., Wi-fi, Bluetooth, NFC, etc.) manner.

The battery valve 600 may further include a sensor for detecting the humidity information. In this case, the battery valve 600 may acquire the humidity information outside the battery through the sensor.

The communication unit 610 may transmit battery state information to the external device. Here, the battery state information may be received from the battery management system or a separate measurement circuit and may include a voltage, current, a temperature, and the like of the battery. Also, the communication unit 610 may transmit the battery state information detected by the sensor unit 630 to the external device.

Also, the communication unit 610 may communicate with an external server. In this case, the communication unit 610 may transmit various information such as the battery state information detected by the sensor unit 630, whether the battery valve 600 is opened or closed, and a history of receiving the valve opening/closing command to the server.

The opening/closing control unit 620 may open and close a passage through which the inside and the outside of the battery communicate with each other by comparing a pressure inside the battery to a reference value. Here, the reference value may include a first reference value associated with the opening of the passage and a second reference value associated with the closing of the passage. For example, the opening/closing control unit 620 may be a regulator.

For example, the opening/closing control unit 620 may open a valve (that is, the passage is opened) when a pressure inside the battery detected by the sensor unit 630 or a pressure received from a battery management system or a separate measurement circuit is equal to or greater than the first reference value and close the valve (that is, to close the passage) when the pressure inside the battery detected by the sensor unit 630 or the pressure received from the battery management system or the separate measurement circuit is equal to or less than the second reference value.

The opening/closing control unit 620 may set the first reference value and/or the second reference value based on the humidity information. For example, the opening/closing control unit 620 may obtain the humidity information from the communication unit 610. The opening/closing control unit 620 may set the first reference value and the second reference value to be higher as an absolute humidity corresponding to the humidity information is higher. This is done for suppressing an inflow of moisture because the higher the absolute humidity outside the battery, the more moisture is diffused from the outside to flow into the battery when the valve is opened.

Referring to FIG. 7, the opening/closing control unit 620 may set the first reference value as a first value and the second reference value as a second value when the absolute humidity corresponding to the humidity information corresponds to a first section a. For example, the first section may be defined as a section in which the absolute humidity is greater than 0 g/m$^3$ and less than or equal to 15 g/m$^3$ (H1), but is not limited thereto. According to an embodiment, the first value may be defined to 1.5 atm, and the second value may be defined to 1.2 atm, but are not limited thereto.

When the absolute humidity corresponding to the humidity information corresponds to a second section b defined as a section having a value higher than that of the first section, the opening/closing control unit 620 may set the first reference value and the second reference value as values higher than the first value and the second value, respectively. For example, the second section may be defined as a section in which the absolute humidity is greater than 15 g/m$^3$ and less than or equal to 30 g/m$^3$ (H2), but is not limited thereto. According to an embodiment, the opening/closing control unit 620 may set the first reference value to 2.0 atm and the second reference value to 1.5 atm when the absolute humidity corresponding to the humidity information corresponds to the second section, but is not limited thereto.

When the absolute humidity corresponding to the humidity information corresponds to a third section c defined as a section having a value higher than that of the first section, the opening/closing control unit 620 may set the first reference value to 2.5 atm and the second reference value 2.0 atm, but is not limited thereto. For example, the third section may be defined as a section in which the absolute humidity is greater than 30 g/m$^3$, but is not limited thereto.

Referring again to FIG. 6, the opening/closing control unit 620 may calculate an increase rate of the internal pressure of the battery and the first reference value and the second reference value based on the calculated increase rate. For example, the opening/closing control unit 620 may set the first reference value and/or the second reference value to a lower value as the increase rate of the internal pressure of the battery increases. This is done for lowering an internal pressure of the battery by quickly opening the valve (i.e., opening a passage) compared to a case in which an increase rate of the internal pressure of the battery is high.

According to an embodiment, when the internal pressure of the battery increases by a first increment (ex. 0.1 atm) at a first increase rate (ex. 1 atm/1 day), the opening/closing control unit 620 may set the first reference value to 1.5 atm and the second reference value to 1.1 atm, but are not limited thereto. In addition, the opening/closing control unit 620 sets the first reference value to 1.3 atm and the second reference value to 1.1 atm when the internal pressure of the battery increases by the first increment at a second increase rate (ex. 1 atm/1 hour), but are not limited thereto.

In addition, when the internal pressure of the battery increases by a second increment (ex. 0.5 atm) at a third increase rate (ex. 1 atm/1 day), the opening/closing control unit 620 may set the first reference value to 1.2 atm and the second reference value to 1.1 atm, but are not limited thereto. Here, the opening/closing control unit 620 may maintain the first reference value at 1.2 atm for a predetermined time, and after the internal pressure of the battery becomes less than the second reference value to close the valve, when the internal pressure of the battery is maintained below the third increase rate for a predetermined time (ex. 24 hours), the first reference value and/or the second reference value may be reset.

As described above, when the gas generated inside the battery increases by more than a certain value, the gas generated inside the battery may be discharged in time even if the user does not input the valve opening/closing command, thereby minimizing moisture to be diffused from the outside.

In addition, the opening/closing control unit 620 may open or close the passage through a preset cycle to periodically discharge the gas inside the battery to the outside. In this case, the battery valve 600 may include a timer to control the valve to be opened at intervals set by the user.

The sensor unit 630 may measure the pressure inside the battery. Thus, it is possible to detect that a gas is generated inside the battery to increase in pressure. In addition, the sensor unit 630 of the battery valve 600 may include various sensors for detecting the state of the battery, such as the voltage, the current, the temperature, the humidity, and the like in addition to the pressure inside the battery.

The battery valve 600 according to an embodiment of the present invention may be configured to be inserted into a sealing part of the battery. In addition, the battery may have various shapes such as a cylindrical shape, a polygonal shape, and a pouch shape.

Figure 8:
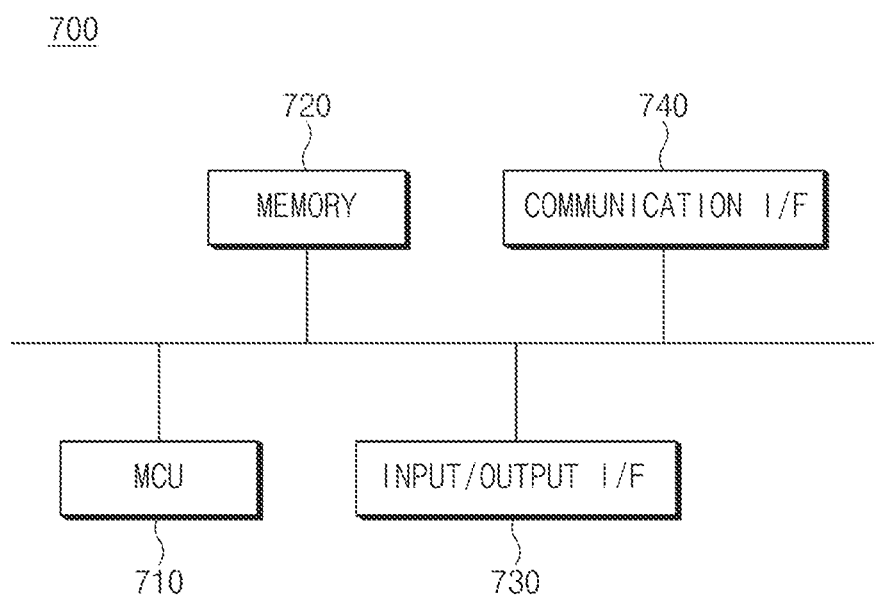
FIG. 8 is a block diagram illustrating a hardware configuration of the battery valve according to an embodiment of the present invention.

FIG. 8 is a block diagram illustrating a hardware configuration of the battery valve according to an embodiment of the present invention.

Referring to FIG. 8, a battery valve 700 may include a microcontroller (MCU) 710, a memory 720, an input/output interface 730, and a communication interface 740.

The microcontroller 710 may process various programs and control each component of the battery valve 700. That is, the microcontroller 710 may perform overall processing and control operations to perform each function of the above-described battery valve 700. The memory 720 may record an operating system program and various programs (e.g., a valve opening/closing control program, a pressure sensing program, etc.). In addition, various data such as pressure data detected by a sensor module and battery valve opening/closing information may be stored in the memory 720.

The input/output interface 730 may provide an input interface and an output interface between a battery cell module and/or a semiconductor switching element. For example, the input/output interface 730 may correspond to the above-described display part. That is, the input/output interface 730 may be configured to allow a user to perform various input operations or to output state information detected by the battery valve, valve opening/closing information, and the like.

The communication interface 740 may enable communication with the outside through a wired/wireless communication network. For example, the communication interface 740 may correspond to the above-described communication unit. That is, the communication interface 740 may transmit battery state information to an external device and perform various transmission/reception operations, such as receiving of a valve opening/closing command from the external device.

As described above, a computer program according to the present invention may be recorded in the memory 720 and processed by the microcontroller 710 and thus may be implemented as a module that performs the above-described functions such as the receiving of the valve open/close command from the external device to open/close the valve as described in FIG. 2.

All components may be coupled to one another to form a single body or to operate as a single body, but the present disclosure is not limited thereto. That is, one or more components are selectively coupled and operated within the scope of the present disclosure.

The terms "comprising," "including," and "having," as used in the claims and specification herein, shall be considered as indicating an open group that may include other elements not specified. Unless terms used in the present disclosure are defined differently, the terms may be construed as meaning known to those skilled in the art. Terms such as terms that are generally used and have been in dictionaries should be construed as having meanings matched with contextual meanings in the art. In this description, unless defined clearly, terms are not ideally, excessively construed as formal meanings.

The above-disclosed subject matter is to be considered illustrative, and not restrictive, and the appended claims are intended to cover all such modifications, enhancements, and other embodiments, which fall within the true spirit and scope of the present invention. Thus, the embodiment of the present invention is to be considered illustrative, and not restrictive, and the technical spirit of the present invention is not limited to the foregoing embodiment. Therefore, the scope of the invention is defined not by the detailed description of the invention but by the appended claims, and all differences within the scope will be construed as being included in the present invention.

The invention claimed is:

1. A battery valve configured to discharge a gas inside a battery to an outside, the battery valve comprising:
   a communicator configured to receive a battery valve opening/closing command from an external device; and
   an opening/closing controller configured to open or close a passage through which the inside of the battery and the outside of the battery communicate with each other according to the battery valve opening/closing command,
   wherein the opening/closing controller is configured to open the passage when a pressure inside the battery is equal to or higher than a first reference value and close the passage when the pressure inside the battery is equal to or lower than a second reference value different from the first reference value.

2. The battery valve of claim 1, further comprising a sensor configured to measure the pressure inside the battery.

3. The battery valve of claim 1, wherein the opening/closing controller is configured to automatically open or close the passage by comparing the pressure inside the battery to the first reference value, and
   wherein the first reference value is changed based on a rate of change of the pressure inside the battery.

4. The battery valve of claim 1, wherein the communicator is configured to transmit state information of the battery to the external device.

5. The battery valve of claim 1, further comprising a power supply configured to supply power to the battery valve.

6. The battery valve of claim 5, wherein the power supply is located under the opening/closing controller, and
   wherein the communicator is located above the opening/closing controller.

7. The battery valve of claim 6, further comprising a sensor configured to measure the pressure inside the battery,
   wherein the sensor overlaps the opening/closing controller in a horizontal direction and does not overlap the power supply or the communicator in the horizontal direction.

8. The battery valve of claim 1, wherein the external device comprises at least one of a battery management system (BMS) or a user terminal.

9. The battery valve of claim 1, wherein the communicator is configured to communicate with the external device in a wired or wireless manner.

10. The battery valve of claim 1, further comprising an alarm configured to generate a warning alarm when the pressure inside the battery is higher than a preset reference value.

11. The battery valve of claim 1, wherein the opening/closing controller is configured to open or close the passage through a preset cycle.

12. A battery comprising:
    a battery electrode;
    a battery case configured to accommodate the battery electrode; and
    a battery valve configured to open or close a passage through which an inside of the battery case and an outside of the battery case communicate with each other according to a battery valve opening/closing command received from an external device,
    wherein the battery valve is configured to open the passage when a pressure inside the battery is equal to or higher than a first reference value and close the passage when the pressure inside the battery is equal to or lower than a second reference value different from the first reference value.

13. The battery of claim 12, wherein the battery electrode includes an electrode lead, and
    wherein the battery valve is located below the electrode lead.

14. A battery valve configured to discharge a gas inside a battery to an outside, the battery valve comprising:
    a sensor configured to measure a pressure inside the battery; and
    an opening/closing controller configured to open or close a passage through which the inside of the battery and the outside of the battery communicate with each other by comparing the pressure inside the battery to a reference value,
    wherein the reference value comprises a first reference value associated with an opening of the passage and a second reference value associated with a closing of the passage, and
    wherein the opening/closing controller is configured to set the first reference value and the second reference value based on humidity information.

15. The battery valve of claim 14, further comprising a communicator configured to receive the humidity information from an external device.

16. The battery valve of claim 14, wherein the opening/closing controller is configured to:
    set the first reference value as a first value and the second reference value as a second value when an absolute humidity corresponding to the humidity information corresponds to a first section having an absolute humidity value, and
    set the first reference value and the second reference value as values higher than the first value and the second value, respectively, when the absolute humidity corresponding to the humidity information corresponds to a second section defined as a section having an absolute humidity value higher than that of the first section.

17. The battery valve of claim 14,
wherein the opening/closing controller is further configured to calculate an increase rate of the pressure inside the battery and set the first reference value and the second reference value based on the increase rate.

18. The battery valve of claim 17, wherein the opening/closing controller is configured to set the first reference value or the second reference value to a lower value of the absolute humidity value as the increase rate increases.

\* \* \* \* \*